United States Patent
Goupil et al.

(10) Patent No.: US 11,866,154 B2
(45) Date of Patent: Jan. 9, 2024

(54) SYSTEM AND METHOD FOR CONTROLLING AN ACTUATOR FOR A CONTROL SURFACE OF AN AIRCRAFT

(71) Applicant: Airbus Operations (S.A.S.), Toulouse (FR)

(72) Inventors: Philippe Goupil, Toulouse (FR); Hervé Le Berre, Toulouse (FR)

(73) Assignee: Airbus Operations (S.A.S.), Toulouse (FR)

(*) Notice: Subject to any disclaimer, the term of this patent is extended or adjusted under 35 U.S.C. 154(b) by 723 days.

(21) Appl. No.: 17/065,926

(22) Filed: Oct. 8, 2020

(65) Prior Publication Data

US 2021/0107628 A1 Apr. 15, 2021

(30) Foreign Application Priority Data

Oct. 14, 2019 (FR) ...................................... 1911376

(51) Int. Cl.
*B64C 13/24* (2006.01)
*B64C 9/00* (2006.01)
*B64C 13/02* (2006.01)

(52) U.S. Cl.
CPC .............. *B64C 13/24* (2013.01); *B64C 9/00* (2013.01); *B64C 13/02* (2013.01)

(58) Field of Classification Search
CPC ....... B64C 13/24; B64C 13/02; B64C 13/503; B64C 13/505; B64C 9/00; G05D 1/0077
See application file for complete search history.

(56) References Cited

U.S. PATENT DOCUMENTS

| | | | | |
|---|---|---|---|---|
| 3,551,776 A | * | 12/1970 | Tawfik | G05D 1/0077 318/564 |
| 3,857,535 A | * | 12/1974 | Osder | G05D 1/0816 318/565 |
| 4,198,021 A | | 4/1980 | Meredith et al. | |
| 6,059,225 A | | 5/2000 | Vidal et al. | |
| (Continued) | | | | |

OTHER PUBLICATIONS

Goupil, P. Airbus State of the Art and Practices on FDI and FTC in Flight Control System, Google Scholar, Control Engineering Practice, vol. 19, Iss. 6, Jun. 2011, pp. 524-539. (Year: 2011).*

(Continued)

*Primary Examiner* — Russell Frejd
(74) *Attorney, Agent, or Firm* — KDW Firm PLLC

(57) ABSTRACT

A system and method for controlling an actuator for a control surface of an aircraft includes a processing unit configured for acquiring a set of N values of the same parameter, N being equal to 2×p or to 2×p+1, p being an integer greater than or equal to 2, and determining a voted value of the parameter by a voter (15) with N inputs. The voter with N inputs includes a module for determining two intermediate values from among the values of a subset of 2×p values of the set of N values of the parameter, this module including at least p+1 voters with 2×p−1 inputs, receiving as input distinct subsets of 2×p−1 inputs of the subset of 2×p inputs, two sub-modules for determining a maximum value and a minimum value, respectively, each receiving as input the outputs of the various voters with 2×p−1 inputs and delivering as output the two intermediate values.

9 Claims, 6 Drawing Sheets

(56) References Cited

U.S. PATENT DOCUMENTS

| | | | | |
|---|---|---|---|---|
| 7,366,592 | B2* | 4/2008 | Delaplace | G05D 1/0066 |
| | | | | 701/16 |
| 8,234,019 | B2* | 7/2012 | Todeschi | G05B 19/048 |
| | | | | 244/75.1 |
| 2007/0083301 | A1* | 4/2007 | Yeh | B64C 13/503 |
| | | | | 244/175 |
| 2020/0262544 | A1* | 8/2020 | Wilkens | G06F 13/4004 |

OTHER PUBLICATIONS

Amin et al., A.A. A Review of Fault Tolerant Control Systems: Advancements and Applications, Google Scholar, Measurement, vol. 143, Sep. 2019, pp. 58-68. (Year: 2019).*

Gohil et al., "Redundancy management and synchronization in avionics communication products", Integrated communication, navigation and surveillance conference (ICNS), 2011, IEEE, pp. C3-1,May 10, 2011 (May 10, 2011).

French Search Report for Application No. 1911376 dated Jun. 3, 2020.

* cited by examiner

SYSTEM AND METHOD FOR CONTROLLING AN ACTUATOR FOR A CONTROL SURFACE OF AN AIRCRAFT

CROSS-REFERENCE TO RELATED APPLICATION

This application claims the benefit of and priority to French patent application number 19 11376 filed on Oct. 14, 2019, the entire disclosure of which is incorporated by reference herein.

TECHNICAL FIELD

The disclosure herein relates to the field of avionics systems on board aircraft.

BACKGROUND

An aircraft comprises a set of avionics computers, in particular a set of flight control computers responsible for determining control signals for controlling actuators for various control surfaces of the aircraft. A control signal for controlling an actuator is generally determined according to a set of parameters, such as for example a speed of the aircraft, an altitude of the aircraft, an angle of attack of the aircraft, etc. For reasons of availability of the avionics functions of the aircraft, each parameter is generally measured or estimated according to information or signals acquired redundantly from a plurality of sources of information corresponding for example to redundant sensors. It is thus typical to acquire 3 redundant values of the same parameter, for example from 3 sensors. Generally, the flight control system comprises a voter with 3 inputs which receives as input these 3 values of the parameter. This voter delivers at its output the median value of the 3 values.

This median value is used by the flight control system as the value of the parameter to determine the control signal for controlling the actuator in question. The use of a voter makes it possible in particular to avoid using a divergent value of the parameter delivered by a faulty sensor and to improve the parameter measurement availability. As mentioned above, current flight control systems generally use voters with 3 inputs allowing a median value of 3 values of a parameter to be obtained. However, in the future it is envisaged that the level of redundancy in flight control systems will be improved by using a greater number of values of the same parameter, these values potentially being both from sensors and determined by estimators (these values then being estimated by a mathematical model according to values of other parameters and/or measurements from sensors). This will make it possible in particular to use sensors of dissimilar types for the same parameter. It is thus envisaged that 5 or 7 values will be used for some parameters, or even occasionally a greater number of values. To determine the control signal for controlling an actuator, the flight control system will then have to use a voter comprising the same number of inputs as values considered of the same parameter, in order to determine a median value for this parameter. Thus, it will be necessary to implement voters comprising a number of inputs greater than 3.

The flight control computers of an aircraft generally have relatively limited resources (memory size, processor power) available. Consequently, the software implemented in the flight control computers of an aircraft has to use the fewest resources possible, in particular processor time, i.e. to perform the fewest possible elementary operations. This software is generally implemented by visual programming languages, for example such as SCADE. Algorithms are thus described by linking symbols stored in a library. This allows the designers and maintainers of the software to easily visualize the operation thereof. This software is executed according to a real-time principle, over successive execution steps. In order to guarantee the speed of execution of the software, it is necessary to avoid storing intermediate results in the memory. Specifically, a result stored in the memory during a given execution step cannot be reused from the next execution step. The libraries of the aforementioned visual languages comprise a symbol corresponding to a voter with 3 inputs, delivering as output the median value from along the values applied to the 3 inputs. This voter is intended to be executed in a single execution step of the software.

To produce a voter having a number N of inputs greater than 3, delivering as output the median value of the values applied to these N inputs, there are algorithms based on methods for sorting the input values. These algorithms require that intermediate results be stored in the memory, which would require a plurality of execution steps of a real-time program in a flight control computer. This would lead to delays in the calculation of the median value of a parameter, which might not be compatible with time constraints for the detection of erroneous values of the parameter. Additionally, their representation using a visual language would be complex, which would make them difficult for the software designers and maintainers to read.

SUMMARY

A particular aim of the disclosure herein is to provide a solution to this problem. The disclosure herein relates to a system for controlling an actuator for a control surface of an aircraft, the system comprising a processing unit configured for acquiring, from a set of sources of information on the aircraft, a set of values of the same parameter, the set comprising a number N of values;

determining, by a voter with N inputs, a value, referred to as a voted value, of the parameter according to the set of N values of the parameter; and determining a control signal for controlling the actuator according to the voted value of the parameter, the control system being configured to apply this control signal to the actuator.

The control system is noteworthy in that, when the set of values of the parameter comprises a number N of values greater than three, N being equal to $2 \times p$ or to $2 \times p+1$ depending on whether N is even or odd, p being an integer greater than or equal to 2, the voter with N inputs comprises a module for determining two intermediate values from among the values of a subset of $2 \times p$ values of the set of N values of the parameter, this module for determining two intermediate values comprising:

a set of at least p+1 voters with $2 \times p-1$ inputs, the voters with $2 \times p-1$ inputs receiving as input distinct subsets of $2 \times p-1$ inputs of the subset of $2 \times p$ inputs;

a sub-module for determining a maximum value, receiving as input the outputs from the various voters with $2 \times p-1$ inputs and delivering as output a first of the two intermediate values; and a sub-module for determining a minimum value, receiving as input the outputs of the various voters with $2 \times p-1$ inputs and delivering as output a second of the two intermediate values.

Thus, the voter with N inputs according to the disclosure herein is based on the use of a set of voters having an odd number of inputs immediately smaller than the number of inputs N. Such a set of voters is straightforward to represent using a visual programming language. The modules for determining the minimum and maximum values are also straightforward to represent using a visual programming language. When the set of voters corresponds to voters having a number of inputs greater than 3, these voters may themselves be represented using the principle of the disclosure herein. Thus, by using the principle of the disclosure herein recursively, it is possible to represent a voter having any number N of inputs on the basis of voters with 3 inputs. The voters with 3 inputs, and the modules for determining the minimum and maximum values, require only one execution step of real-time software. Consequently, the voter with N inputs according to the disclosure herein is implemented in a single execution step of the real-time software of a flight control computer of an aircraft.

In one embodiment, when the number N is an even number equal to 2×p, the voter with N inputs further comprises a sub-module for calculating an average value, which receives as inputs the two intermediate values, and the output of the voter with N inputs corresponds to the output of the sub-module for calculating the average value.

In another embodiment, when the number N is an odd number equal to 2×p+1, the voter with N inputs further comprises a voter with 3 inputs, the voter with 3 inputs receiving as inputs, on the one hand, the one of the N inputs which does not belong to the subset of 2×p inputs and, on the other hand, the two intermediate values, and the output of the voter with N inputs corresponds to the output of the voter with 3 inputs.

In particular, the number N is equal to 5 and the module for determining two intermediate values comprises 3 voters with 3 inputs.

Again in particular, the number N is equal to 7 and the module for determining two intermediate values comprises 4 voters with 5 inputs.

Advantageously, to determine the control signal for controlling the actuator according to the voted value of the parameter, the processing unit further determines a weighted value of the parameter, this weighted value corresponding to a weighted average of the voted value and of the two intermediate values, and the processing unit determines the control signal for controlling the actuator according to the weighted average.

Again advantageously, to determine the control signal for controlling the actuator according to the voted value of the parameter, the processing unit further determines an average value of the N values of the parameter and a value, referred to as a passivated value, of the parameter, this passivated value corresponding to the output of a voter with 3 inputs receiving as inputs the average value, the voted value plus a threshold value and the voted value minus the threshold value, and the processing unit determines the control signal for controlling the actuator according to the passivated value.

The disclosure herein also relates to a method for controlling an actuator for a control surface of an aircraft, the method comprising the following steps implemented by a processing unit of a control system for controlling the actuator:

acquiring, from a set of sources of information on the aircraft, a set of values of the same parameter, the set comprising a number N of values;

determining, by a voter with N inputs, a value, referred to as a voted value, of the parameter according to the set of N values of the parameter; and determining a control signal for controlling the actuator according to the voted value of the parameter, the method further comprising a step consisting in or comprising the control system applying this control signal for controlling the actuator.

The method is noteworthy in that, when the set of values of the parameter comprises a number N of values greater than three, N being equal to 2×p or to 2×p+1 depending on whether N is even or odd, p being an integer greater than or equal to 2, the step of determining the voted value by the voter with N inputs comprises determining two intermediate values from among the values of a subset of 2×p values of the set of N values of the parameter, according to the following sub-steps:

implementing a set of at least p+1 voters with 2×p−1 inputs, the voters with 2×p−1 inputs receiving as input distinct subsets of 2×p−1 inputs of the subset of 2×p inputs;

determining a first of the two intermediate values corresponding to an output of a sub-module for determining a maximum value, receiving as input the outputs of the various voters with 2×p−1 inputs; and determining a second of the two intermediate values corresponding to an output of a sub-module for determining a minimum value, receiving as input the outputs of the various voters with 2×p−1 inputs.

The disclosure herein also relates to an aircraft comprising such a control system for controlling an actuator for a control surface.

BRIEF DESCRIPTION OF THE DRAWINGS

The disclosure herein will be better understood on reading the following description and on examining the appended figures.

DETAILED DESCRIPTION

Figure 2:
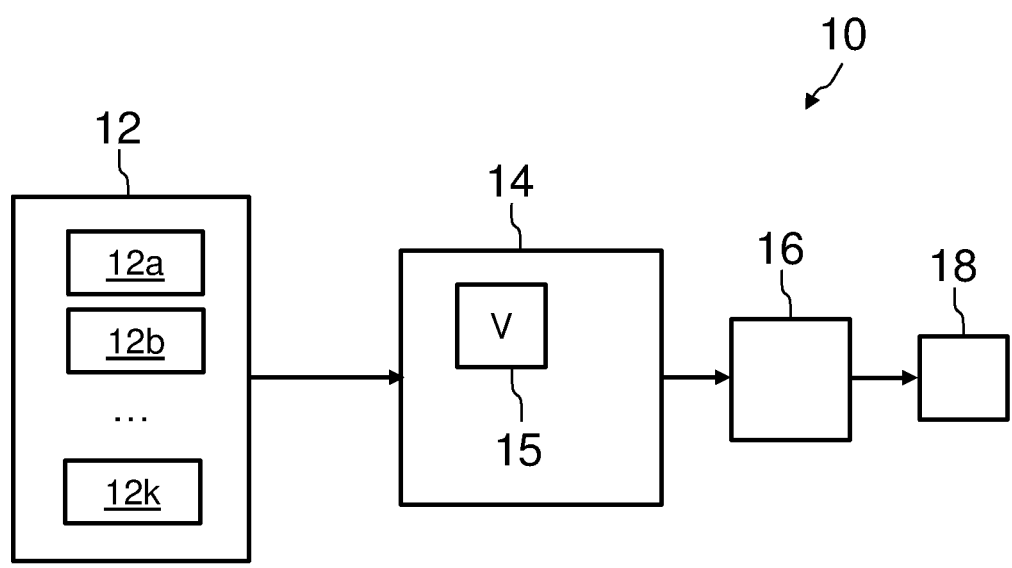
FIG. 2 schematically illustrates a control system for controlling an actuator for a control surface according to one embodiment of the disclosure herein.

The control system 10 for controlling an actuator 18 for a control surface of an aircraft, such as shown in FIG. 2, comprises a processing unit 14. The processing unit 14 is connected at input to a set 12 of sources of information 12a, 12b ... 12k. The processing unit 14 comprises a voter 15 (denoted by V in the figure) with N inputs, N being an integer greater than 3. The number N is considered to be equal to 2×p or to 2×p+1 depending on whether N is even or odd, p being an integer greater than or equal to 2. The control system 10 for controlling the actuator 18 also comprises a controller 16 for controlling the actuator 18. The controller 16 is connected at input to an output of the processing unit 14.

Figure 1:
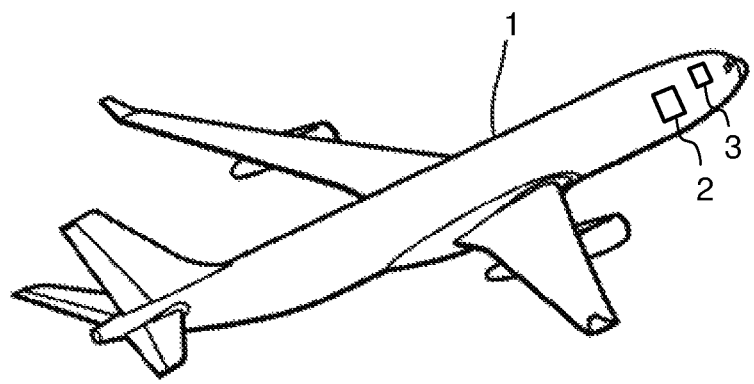
FIG. 1 is a view of an aircraft comprising a control system for controlling an actuator for a control surface.

The control system 10 is for example located in an avionics bay 2 of an aircraft such as the aircraft 1 shown in FIG. 1. This avionics bay is generally located in proximity to a cockpit 3 of the aircraft.

In operation, the processing unit acquires, from the set 12 of sources of information, a set of N values of the same parameter. These N values are respectively received by the N inputs of the voter 15, which delivers as output a value, referred to as a voted value, of the parameter in question. The processing unit 14 determines a control signal for controlling the actuator according at least to the voted value of the parameter and the unit transmits this control signal to the controller 16 which controls the actuator 18 accordingly.

Figure 3:
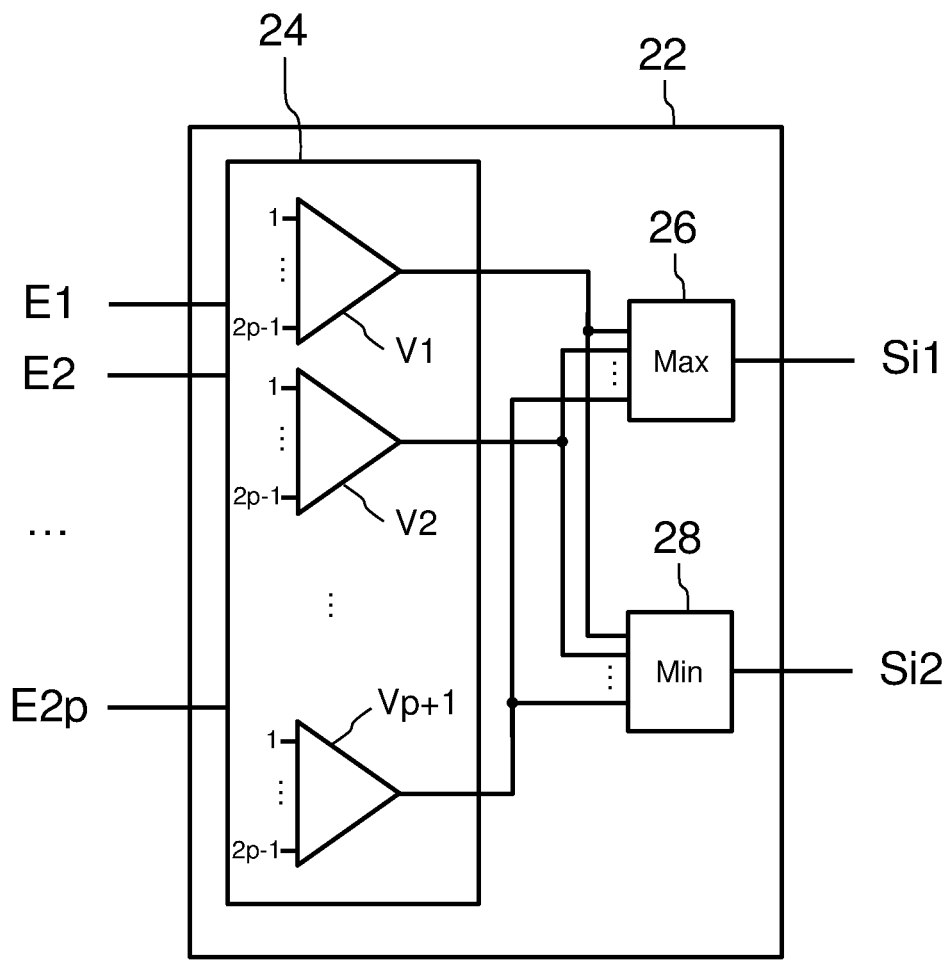
FIG. 3 schematically illustrates one embodiment of a module for determining intermediate values of the control system for controlling an actuator of FIG. 2.
Figure 4:
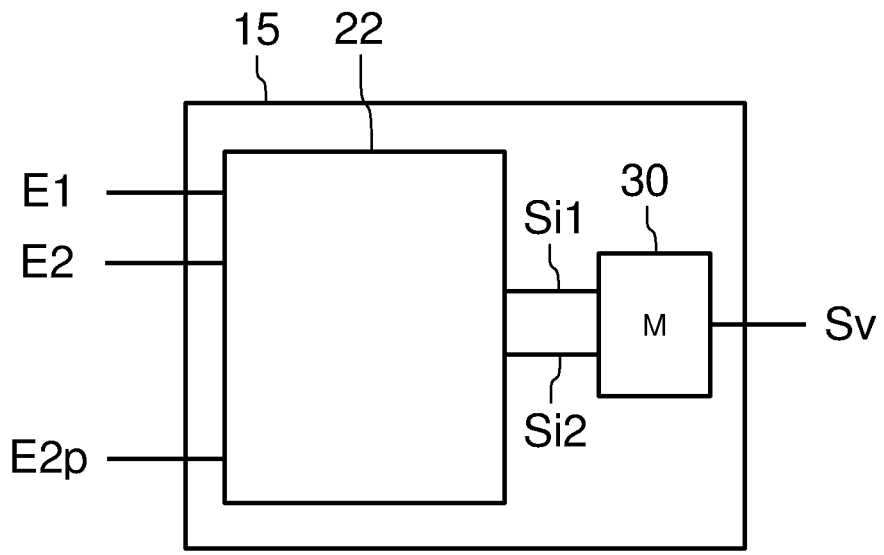
FIG. 4 schematically illustrates a first example of a voter of a control system for controlling an actuator for a control surface according to one embodiment of the disclosure herein, for an even number of inputs.
Figure 5:
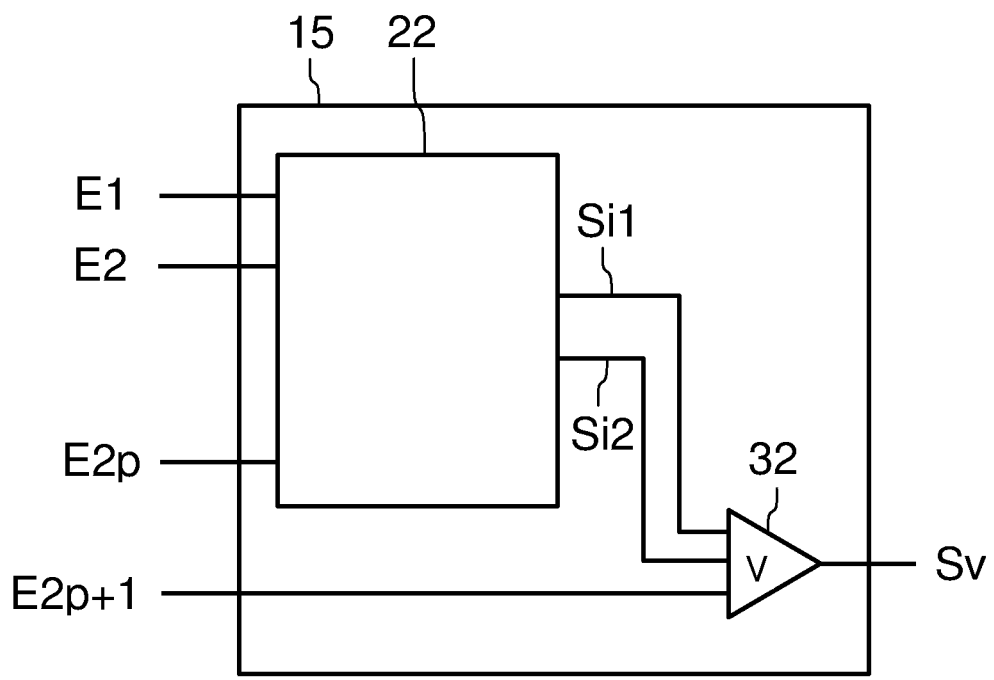
FIG. 5 schematically illustrates a second example of a voter of a control system for controlling an actuator for a control surface according to one embodiment of the disclosure herein, for an odd number of inputs.

As shown in FIGS. 4 and 5, the voter 15 comprises a module 22 for determining two intermediate values Si1, Si2 from among the values of a subset of 2×p values of the set of N values of the parameter. As shown in FIG. 3, this module 22 comprises a set 24 of voters, comprising at least p+1 voters V1, V2 ... Vp+1 each comprising 2×p−1 inputs. These various voters receive as input distinct subsets of 2×p−1 inputs of the subset of 2×p inputs. The module 22 for determining two intermediate values also comprises a sub-module 26 for determining a maximum value and a sub-module 28 for determining a minimum value. The two sub-modules 26 et 28 each receive as inputs the outputs of the various voters of the set 24 of voters. The sub-module 26 delivers as output the first intermediate value Si1 and the sub-module 28 delivers as output the second intermediate value Si2. Implementing the set 24 of at least p+1 voters makes it possible to guarantee the presence of at least one instance of each of the two intermediate values at the output of the p+1 voters. The sub-modules 26 and 28 then make it possible to keep a single instance of each of the two intermediate values Si1 and Si2.

In the embodiment illustrated by FIG. 4, the number N is even and equal to 2×p. The subset of 2×p values of the set of N values of the parameter then corresponds to the values of the 2×p inputs E1, E2 ... E2p of the voter 15. The voter 15 further comprises a sub-module 30 (denoted by M in the figure) for calculating an average value, which receives as inputs the two intermediate values Si1 and Si2. The output Sv of the voter with N inputs corresponds to the output of the sub-module 30 for calculating the average value. The voter 15 with N inputs is thus produced by using, in the module 22, a set of p+1 voters each comprising 2×p−1 inputs, i.e. an odd number of inputs immediately smaller than the number N of inputs of the voter 15.

In the embodiment illustrated by FIG. 5, the number N is odd and equal to 2×p+1. The subset of 2×p values of the set of N values of the parameter then corresponds to the values of 2×p inputs E1, E2 ... E2p from among the N=2×p+1 inputs of the voter 15. The voter 15 further comprises a voter 32 with 3 inputs, which receives as inputs the two intermediate values Si1 and Si2, as well as another input E2p+1 of the voter 15, distinct from the 2×p inputs E1, E2 ... E2p. The output Sv of the voter with N inputs corresponds to the output of the voter 32. The voter 15 with N inputs is thus produced by using the voter 32 with 3 inputs and, in the module 22, a set of p+1 voters each comprising 2×p−1 inputs, i.e. an odd number of inputs immediately smaller than the number N of inputs of the voter 15.

Figure 6:
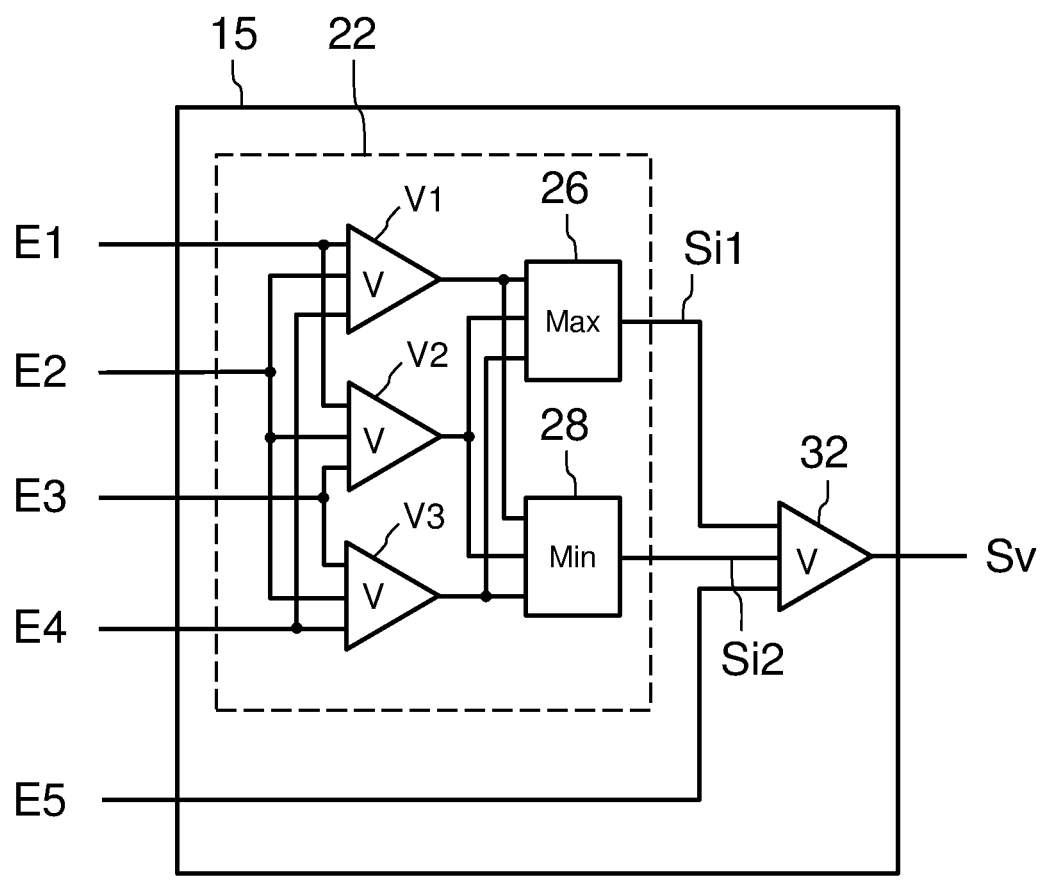
FIG. 6 schematically illustrates one embodiment of the voter of FIG. 5, when this voter comprises 5 inputs.

The embodiment illustrated by FIG. 6 corresponds to the embodiment of FIG. 5, when the number N is equal to 5. The subset of 2×p values of the set of N values of the parameter then corresponds to the values of 4 inputs E1, E2, E3, E4 from among the 5 inputs of the voter 15. The module 22 then comprises 3 voters V1, V2, V3 each comprising 3 inputs. These various voters receive at their respective inputs different combinations of the values of the inputs E1, E2, E3 and E4. In the example illustrated in FIG. 6, the voter V1 receives the values of the inputs E1, E2, E4, the voter V2 receives the values of the inputs E1, E2, E3 and the voter V3 receives the values of the inputs E2, E3, E4. Other combinations of the inputs E1, E2, E3 and E4 are however possible without departing from the scope of the disclosure herein. The outputs of the 3 voters V1, V2 and V3 are received, on the one hand, by the sub-module 26 for determining a maximum value and, on the other hand, by the sub-module 28 for determining a minimum value. Thus, the intermediate value Si1 corresponding to the output of the sub-module 26 is equal to the largest of the values of the outputs of the 3 voters V1, V2 and V3. The intermediate value Si2 corresponding to the output of the sub-module 28 is equal to the smallest of the values of the outputs of the 3 voters V1, V2 and V3. The inventors have demonstrated that these two intermediate values Si1 and Si2 correspond, from among the values of the four inputs E1, E2, E3 and E4, to the two values of the inputs that are closest to the median value of the inputs. The voter 15 further comprises a voter 32 with 3 inputs, which receives as inputs the two intermediate values Si1 and Si2, as well the fifth input E5 of the voter 15, distinct from the 4 inputs E1, E2, E3, E4. The output Sv of the voter with 5 inputs corresponds to the output of the voter 32. The voter 15 with 5 inputs is thus produced by using voters with 3 inputs (odd number of inputs immediately smaller than 5), and the sub-modules 26 and 28 for determining maximum and minimum values. This voter 15 requires no iterative calculation which would require a plurality of execution steps of a real-time program in a flight control computer. As such, no storage in the memory of an intermediate value is required for the purpose of such an iterative calculation. Additionally, it may be easily represented using a visual language. The representation using such a visual language would be similar to the representation illustrated in FIG. 6.

Figure 7:
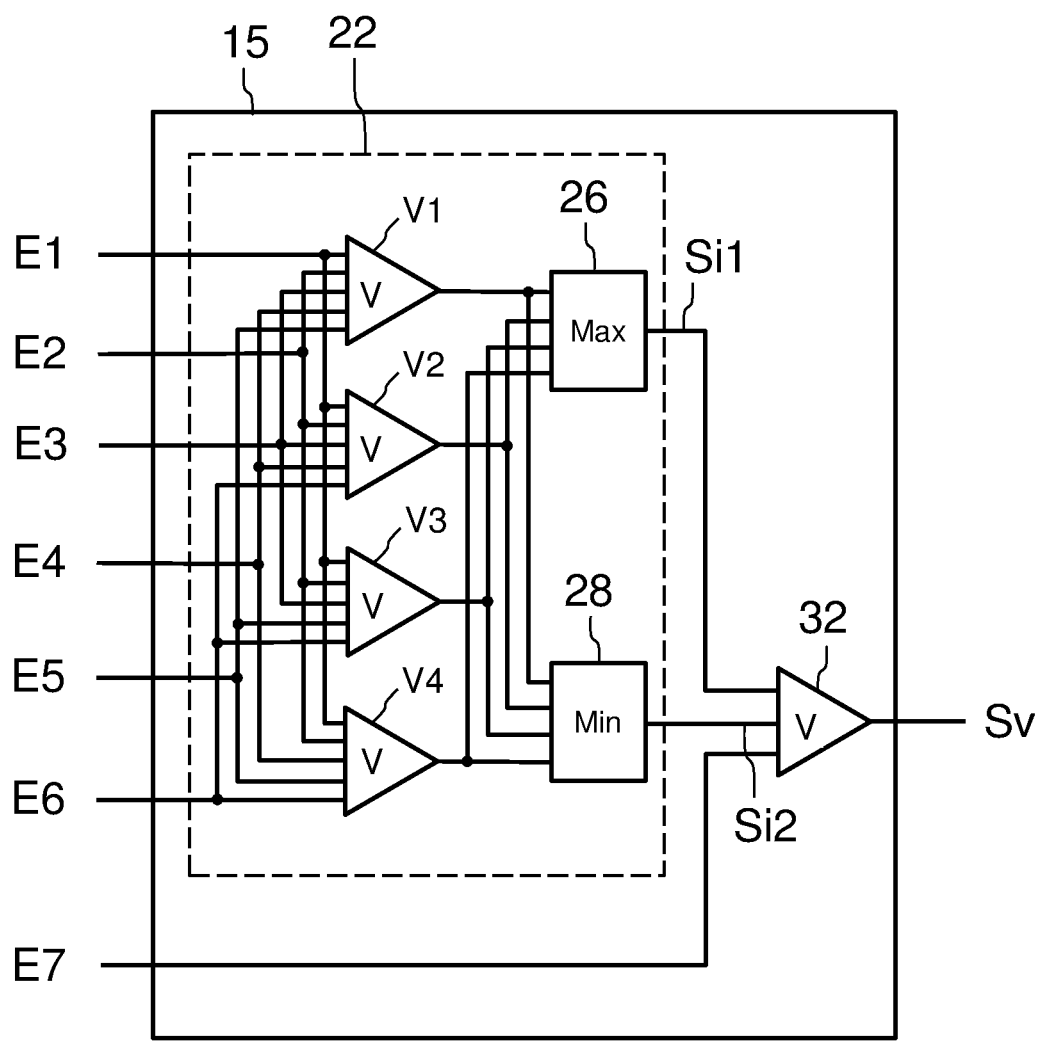
FIG. 7 schematically illustrates one embodiment of the voter of FIG. 5, when this voter comprises 7 inputs.

The embodiment illustrated by FIG. 7 corresponds to the embodiment of FIG. 5, when the number N is equal to 7. The subset of 2×p values of the set of N values of the parameter then corresponds to the values of 6 inputs E1, E2, E3, E4, E5, E6 from among the 7 inputs of the voter 15. The module 22 then comprises 4 voters V1, V2, V3, V4 each comprising 5 inputs. These various voters receive at their respective inputs different combinations of the values of the inputs E1, E2, E3, E4, E5 and E6. In the example illustrated in FIG. 7, the voter V1 receives the values of the inputs E1, E2, E3, E4, E5, the voter V2 receives the values of the inputs E1, E2, E3, E4, E6, the voter V3 receives the values of the inputs E1, E2, E3, E5, E6 and the voter V4 receives the values of the inputs E1, E2, E4, E5, E6. Other combinations of the inputs E1, E2, E3, E4, E5 and E6 are however possible without departing from the scope of the disclosure herein. The outputs of the 4 voters V1, V2, V3 and V4 are received, on the one hand, by the sub-module 26 for determining a maximum value and, on the other hand, by the sub-module 28 for determining a minimum value. Thus, the intermediate value Si1 corresponding to the output of the sub-module 26 is equal to the largest of the values of the outputs of the 4 voters V1, V2, V3 and V4. The intermediate value Si2 corresponding to the output of the sub-module 28 is equal to the smallest of the values of the outputs of the 4 voters V1, V2, V3 and V4. The inventors have demonstrated that these two intermediate values Si1 and Si2 correspond, from among the values of the six inputs E1, E2, E3, E4, E5 and E6, to the two values of the inputs that are closest to the median value of the inputs. The voter 15 further comprises a voter 32 with 3 inputs, which receives as inputs the two intermediate values Si1 and Si2, as well as the seventh input E7 of the voter 15, distinct from the 6 inputs E1, E2, E3, E4, E5, E6. The output Sv of the voter with 7 inputs corresponds to the output of the voter 32. The voter 15 with 7 inputs is thus produced by using voters with 5 inputs (odd number of inputs immediately smaller than 7), the voter 32 with 3 inputs, and the sub-modules 26 and 28 for determining minimum and maximum values. This voter 15 requires no iterative calculation which would require a plurality of execution steps of a real-time program in a flight control computer. As such, no storage in the memory of an intermediate value is required for the purpose of such an iterative calculation. Additionally, it may be easily represented using a visual language. The representation using such a visual language would be similar to the representation illustrated in FIG. 7. Each of the 4 voters with 5 inputs used to produce the voter with 7 inputs corresponds for example to the voter with 5 inputs illustrated in FIG. 6.

The voters with N inputs according to the various embodiments of the disclosure herein, for example the voters with 5 inputs and with 7 inputs corresponding to FIGS. 6 and 7, respectively, may be defined using symbols in the library of the visual language used to define the flight control system of an aircraft.

In one particular embodiment, the processing unit further determines a weighted value of the parameter in question, this weighted value corresponding to a weighted average of the voted value corresponding to the output Sv of the voter 15 and of the two intermediate values Si1 and Si2. The processing unit then determines the control signal for controlling the actuator according to the weighted average.

Figure 8:
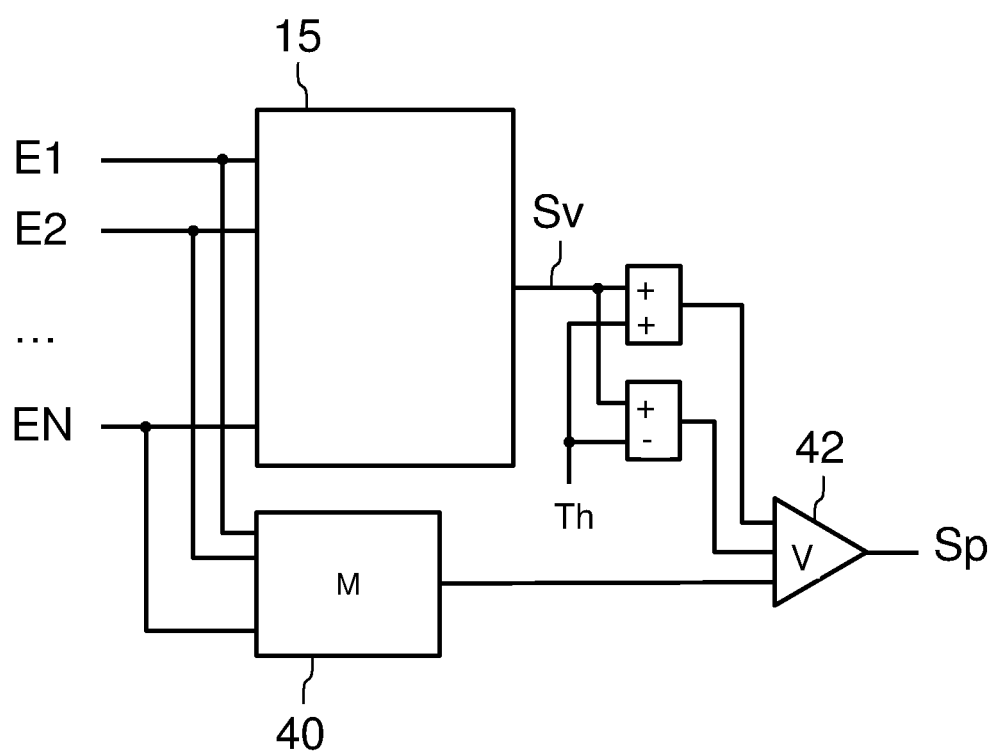
FIG. 8 schematically illustrates one particular way of determining a control signal for controlling an actuator for a control surface in a control system according to the disclosure herein.

In another particular embodiment illustrated by FIG. 8, in addition to the voter 15 with N inputs, the processing unit 14 also comprises a module 40 (denoted by M in the figure) for determining an average value of the values of the N inputs E1 to EN, as well as a voter 42 with 3 inputs. This voter 42 receives, over one input, the output of the module 40 for determining the average value of the values of the N inputs E1 to EN. Over its other two inputs, this voter 42 receives, on the one hand, the value of the output Sv of the voter 15 plus a threshold value Th and, on the other hand, the value of the output Sv of the voter 15 minus the threshold value Th. The output Sp of the voter 42 corresponds to a value, referred to as a passivated value, of the parameter in question. The processing unit determines the control signal for controlling the actuator according to the passivated value. The threshold value Th is chosen such that in normal operation, when the values E1 to EN of the parameter that are delivered by the various sources of information are consistent with one another, the average value of the values of the N inputs E1 to EN is included in a range of values between the value of the output Sv of the voter 15 minus the threshold value Th and the value of the output Sv of the voter 15 plus the threshold value Th. Thus, during such normal operation, the passivated value of the output Sp is equal to the average of the values of the N inputs E1 to EN, which makes it possible to improve the accuracy of the parameter value used to determine the control signal for controlling the actuator. If the value of at least one of the inputs E1 to En is divergent, leading to an erroneous value of the average value, this average value is no longer included in the range of values. The passivated value is then equal to the value of the output Sv of the voter 15 plus the threshold value Th or to the value of the output Sv of the voter 15 minus the threshold value Th depending on whether the at least one input is upwardly or downwardly divergent. This thus allows a passivation of the average value: the passivated value of the output Sp is thus constrained within a range ±Th around the value of the output Sv of the voter 15.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A system for controlling an actuator for a control surface of an aircraft, the system comprising a processing unit configured for:
   acquiring, from a set of sources of information on the aircraft, a set of values of a same parameter, the set comprising a number N of values;
   determining, by a voter with N inputs, a value, referred to as a voted value, of the parameter according to the set of N values of the parameter; and
   determining a control signal for controlling the actuator according to the value of the parameter determined by the voter;
   wherein the control system is configured to apply this control signal to the actuator;
   wherein when the set of values of the parameter comprises a number N of values greater than three, N being equal to 2×p or to 2×p+1 depending on whether N is even or odd, p being an integer greater than or equal to 2, the voter with N inputs comprises a module for determining two intermediate values from among the values of a subset of 2×p values of the set of N values of the parameter, this module for determining two intermediate values comprising:
- a set of at least p+1 voters with 2×p−1 inputs, the voters with 2×p−1 inputs receiving as input distinct subsets of 2×p−1 inputs of the subset of 2×p inputs;
- a sub-module for determining a maximum value, receiving as input outputs from the various voters with 2×p−1 inputs and delivering as output a first of the two intermediate values; and
- a sub-module for determining a minimum value, receiving as input the outputs of the various voters with 2×p−1 inputs and delivering as output a second of the two intermediate values.

2. The system according to claim 1, wherein when the number N is an even number equal to 2×p, the voter with N inputs further comprises a sub-module for calculating an average value, which receives as inputs the two intermediate values, and the output of the voter with N inputs corresponds to the output of the sub-module for calculating the average value.

3. The system according to claim 1, wherein when the number N is an odd number equal to 2×p+1, the voter with N inputs further comprises a voter with 3 inputs, the voter with 3 inputs receiving as inputs, the one of the N inputs which does not belong to the subset of 2×p inputs and, the two intermediate values, and the output of the voter with N inputs corresponds to the output of the voter with 3 inputs.

4. The system according to claim 3, wherein the number N is equal to 5 and the module for determining two intermediate values comprises 3 voters with 3 inputs.

5. The system according to claim 3, wherein the number N is equal to 7 and the module for determining two intermediate values comprises 4 voters with 5 inputs.

6. The system according to claim 1, wherein to determine the control signal for controlling the actuator according to the voted value of the parameter, the processing unit further determines a weighted value of the parameter, this weighted value corresponding to a weighted average of the voted value and of the two intermediate values, and the processing unit determines the control signal for controlling the actuator according to the weighted average.

7. The system according to claim 1, wherein to determine the control signal for controlling the actuator according to the voted value of the parameter, the processing unit further determines an average value of the N values of the parameter and a value, referred to as a passivated value, of the parameter, this passivated value corresponding to the output of a voter with 3 inputs receiving as inputs the average value, the voted value plus a threshold value and the voted value minus the threshold value, and the processing unit determines the control signal for controlling the actuator according to the passivated value.

8. An aircraft comprising a control system for controlling an actuator for a control surface according to claim 1.

9. A method for controlling an actuator for a control surface of an aircraft, the method comprising steps, implemented by a processing unit of a control system for controlling the actuator, of:
- acquiring, from a set of sources of information on the aircraft, a set of values of a same parameter, the set comprising a number N of values;
- determining, by a voter with N inputs, a value, referred to as a voted value, of the parameter according to the set of N values of the parameter; and
- determining a control signal for controlling the actuator according to the value of the parameter determined by the voter;
- the control system applying this control signal for controlling the actuator,
- wherein, when the set of values of the parameter comprises a number N of values greater than three, N being equal to 2×p or to 2×p+1 depending on whether N is even or odd, p being an integer greater than or equal to 2, the step of determining the voted value by the voter with N inputs comprises determining two intermediate values from among the values of a subset of 2×p values of the set of N values of the parameter, according to sub-steps comprising:
- implementing a set of at least p+1 voters with 2×p−1 inputs, the voters with 2×p−1 inputs receiving as input distinct subsets of 2×p−1 inputs of the subset of 2×p inputs;
- determining a first of the two intermediate values corresponding to an output of a sub-module for determining a maximum value, receiving as input the outputs of the various voters with 2×p−1 inputs; and
- determining a second of the two intermediate values corresponding to an output of a sub-module for determining a minimum value, receiving as input the outputs of the various voters with 2×p−1 inputs.

* * * * *